(12) United States Patent
Lee et al.

(10) Patent No.: US 6,451,481 B1
(45) Date of Patent: Sep. 17, 2002

(54) LITHIUM POLYMER BATTERY

(75) Inventors: Jong-min Lee, Seoul; Sung-won Lee, Cheonan, both of (KR)

(73) Assignee: Samsung SDI Co., Ltd., Kyungki-do (KR)

(*) Notice: Subject to any disclaimer, the term of this patent is extended or adjusted under 35 U.S.C. 154(b) by 0 days.

(21) Appl. No.: 09/519,849

(22) Filed: Mar. 6, 2000

(30) Foreign Application Priority Data

Apr. 21, 1999 (KR) .............................. 99-14258

(51) Int. Cl.[7] .............................. H01M 4/58; H01M 6/00
(52) U.S. Cl. .................. 429/218.1; 429/231.1; 29/623.1; 29/623.3; 29/623.5
(58) Field of Search ............... 429/218.1, 231.1, 429/231.8; 29/623.1–623.5

(56) References Cited

U.S. PATENT DOCUMENTS

| | | | | |
|---|---|---|---|---|
| 3,607,403 A | * | 9/1971 | Arrance ........................ 429/27 |
| 6,010,653 A | * | 3/1997 | Menon ..................... 156/308.6 |
| 5,616,152 A | * | 4/1997 | Velasquez et al. ................. 29/2 |
| 5,683,834 A | * | 11/1997 | Fujimoto et al. ............ 429/218 |
| 5,720,780 A | * | 2/1998 | Liu et al. .................... 29/623.1 |
| 5,741,608 A | * | 4/1998 | Kojima et al. ................. 429/94 |
| 5,840,087 A | * | 11/1998 | Gozdz et al. ............... 29/623.3 |
| 5,843,592 A | * | 12/1998 | Barker et al. .................. 429/50 |
| 5,853,914 A | * | 12/1998 | Kawakami .................... 429/66 |
| 5,902,697 A | * | 5/1999 | Guindy et al. ............... 429/153 |
| 5,919,589 A | * | 7/1999 | Kawakami et al. ....... 429/231.8 |
| 5,989,743 A | * | 11/1999 | Yamashita ................... 429/129 |
| 6,001,139 A | * | 12/1999 | Asanuma et al. .......... 29/623.3 |
| 6,063,519 A | * | 5/2000 | Barker et al. ............... 429/122 |
| 6,265,098 B1 | * | 7/2001 | Audit et al. ................. 514/326 |
| 6,371,997 B1 | * | 4/2002 | Chang et al. .............. 29/623.1 |

\* cited by examiner

Primary Examiner—M. Alexandra Elve
Assistant Examiner—L. Edmondson
(74) Attorney, Agent, or Firm—Leydig, Voit & Mayer, Ltd.

(57) ABSTRACT

A lithium secondary battery having a bi-cell type battery cell consisting of an anode plate, a separator fixed to both surfaces of the anode plate and a cathode plate fixed to either outer surface of the separator, wherein the cathode plate includes a cathode current collector, a front cathode sheet fixed to one surface of the cathode current collector, which is adjacent to the anode plate, and a rear cathode sheet fixed to the other surface of the cathode current collector and having a thickness different from that of the front cathode sheet.

3 Claims, 6 Drawing Sheets

LITHIUM POLYMER BATTERY

BACKGROUND OF THE INVENTION

1. Field of the Invention

The present invention relates to a secondary battery, and more particularly, to a lithium secondary battery having an improved high-rate discharging efficiency produced by varying the thickness ratio of cathode sheets fixed to both surfaces of a cathode current collector.

2. Description of the Related Art

Lithium secondary batteries are classified as lithium metal batteries, lithium ion batteries and lithium polymer batteries according to the type of lithium used. A lithium polymer battery is a battery in which lithium ions move between a cathode made of lithium oxide and an anode made of a carbon material during charging/discharging to generate an electromotive force. The lithium polymer battery has an advantage in that it is explosion-free due to the use of a solid polymer electrolyte having an ion conductivity higher than a liquid electrolyte. Also, unlike other kinds of batteries, the lithium polymer battery can overcome the problem of battery performance deteriorating due to byproducts generated during charging and/or discharging. Furthermore, due to its flexibility, much attention has recently been paid to lithium polymer batteries as next generation batteries.

Figure 1:
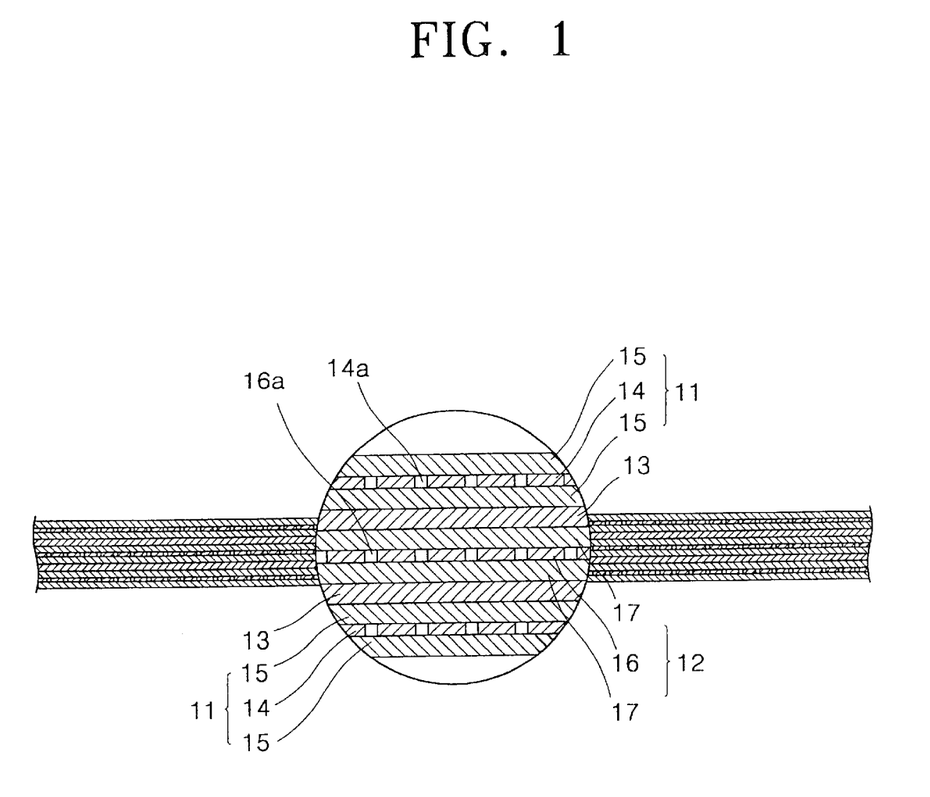
FIG. 1 is an enlarged cross-sectional view illustrating a cathode plate, a separator and an anode plate of a conventional battery.

Various types of lithium polymer batteries can be assembled according to the fabrication method of cathode and anode plates. A bi-cell structure is most widely employed. As shown in FIG. 1, a conventional bi-cell assembled battery is constructed such that a cathode plate 11 is fixed to both sides of an anode plate, 12, respectively, and a separator 13 is interposed between the cathode plate 11 and the anode plate 12 for insulating both plates 11 and 12 from each other.

Also, the cathode plate 11 includes a cathode current collector 14 made of a thin aluminum foil film, and a cathode sheet 15 fixed to at least one surface of the cathode current collector 14. The cathode sheet 15 is fabricated by adding a conductive material, a plasticizer and a binder to a cathode active material as a main component, such as lithium oxide.

The anode plate 12 includes an anode current collector 16 made of a thin aluminum foil film, and an anode sheet 17 fixed to at least one surface of the anode current collector 16. The anode sheet 17 is fabricated by adding a plasticizer, a conductive material and the like to an anode active material as a main component, such as a carbon material.

A plurality of openings 14a and 16a are formed in the cathode and anode current collectors 14 and 16, respectively.

The battery having the above-described configuration is fabricated as follows.

First, primary lamination is performed such that slurry-type source materials of the cathode and anode sheets 15 and 17 are fixed to both surfaces of the cathode and anode current collectors 14 and 16, thereby fabricating the cathode plate 11 and the anode plate 12.

Then, secondary lamination is performed such that the separator 13 is interposed between the cathode plate 11 and the anode plate 12, and predetermined amounts of heat and pressure are applied to the cathode plate 11 and the anode plate 12 with the separator 13 interposed therebetween to fuse them.

Subsequently, plasticizer components contained in the cathode and anode sheets 15 and 17 are extracted and an electrolyte material is impregnated in the space produced by extracting the plasticizer material, thereby forming a battery cell.

Next, the battery cell is inserted into a case having a space for accommodating the battery cell, and the case is hermetically sealed, thereby completing a battery.

The charging and discharging mechanism of a battery will now be described briefly.

Charging refers to a reaction in which lithium ions contained in the lithium oxide of the cathode plate 11 move to the anode plate 12 to then be intercalated between carbon molecules of the anode plate 12. Conversely, discharging refers to a reaction occurring when lithium ions intercalated between carbon molecules of the anode plate 12 move back to the cathode plate 11. Likewise, as lithium ions reciprocate between the cathode and anode plates 11 and 12, an electromotive force is generated.

In this case since the electrical capacity of a battery is generally proportional to the amount of the lithium oxide, which is a cathode active material contained in the cathode sheet 15, in order to increase the capacity of the battery, it is necessary to make the cathode sheet 15 thick.

However, if the cathode sheet 15 is excessively thick, the distance between the anode plate 12 and the cathode current collector 14 stacked to have the separator 13 interposed therebetween increases, causing a sharp decrease in the high-rate discharging efficiency. Thus, it is necessary to change the structure of the cathode plate 11 so as to improve the high-rate discharging efficiency, without changing the overall thickness of the cathode sheet 15.

SUMMARY OF THE INVENTION

To solve the above problems, it is an objective of the present invention to provide an lithium secondary battery having an improved high-rate discharging efficiency by varying the thickness ratio of cathode sheets fixed to both surfaces of a cathode current collector.

Accordingly, to achieve the above objective, there is provided a lithium secondary battery having a bi-cell type battery cell consisting of an anode plate, a separator fixed to both surfaces of the anode plate and a cathode plate fixed to either outer surface of the separator, wherein the cathode plate includes a cathode current collector, a front cathode sheet fixed to one surface of the cathode current collector, which is adjacent to the anode plate, and a rear cathode sheet fixed to the other surface of the cathode current collector and having a thickness different from that of the front cathode sheet.

Also, the thickness ratios of the front and rear cathode sheets is preferably in the range of 5:1 to 1:1.

Further, the front and rear cathode sheets may include one selected from the group consisting of lithium-based oxide, nickel-based oxide and manganese-based oxide, as a main component.

According to another aspect of the present invention, there is provided a lithium secondary battery including an anode plate having an anode current collector and an anode sheet fixed to at least one surface of the anode current collector, a cathode plate having a cathode current collector and a front cathode sheet fixed to one surface of the cathode current collector, which is adjacent to the anode plate, and a rear cathode sheet fixed to the other surface of the cathode current collector and having a thickness different from that of the front cathode sheet, and a separator interposed between the anode plate and the cathode plate.

Also, the thickness ratios of the front and rear cathode sheets is preferably in the range of 5:1 to 1:1.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

A lithium secondary battery according to a preferred embodiment of the present invention will now be described in detail with reference to the accompanying drawings.

Figure 2:
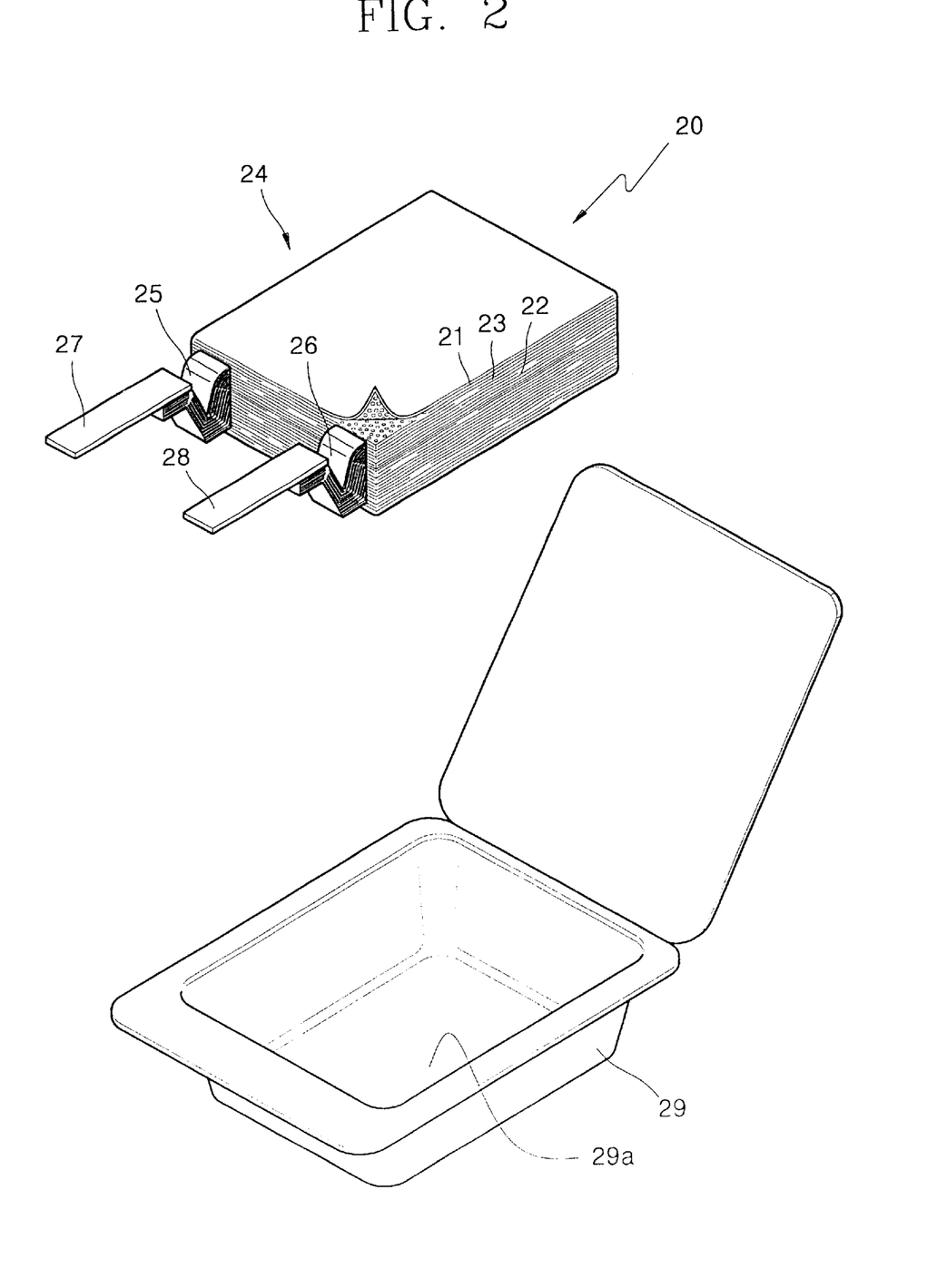
FIG. 2 is an exploded perspective view illustrating a battery according to the present invention.

FIG. 2 illustrates a battery 20 according to the present invention. Referring to FIG. 2, the battery 20 includes a battery cell 24 formed by stacking a plurality of assembled batteries each having a cathode plate 21, an anode plate 22 and a separator 23 interposed between the cathode and anode plates 21 and 22.

A cathode tap 25 and an anode tap 26 extend from one-side edge of the cathode plate 21 and the anode plate 22, respectively, and the extending cathode and anode taps 25 and 26 are collected. The collected taps 25 and 26 are bent in a V-shape and the ends thereof are welded to a cathode terminal 27 and an anode terminal 28, respectively.

Next, a case 29 having a space 29a in which the battery cell 24 is accommodated is provided. The cathode and anode terminals 27 and 28 protrude outside of the case 29 when the case 28 is hermetically sealed.

Figure 3:
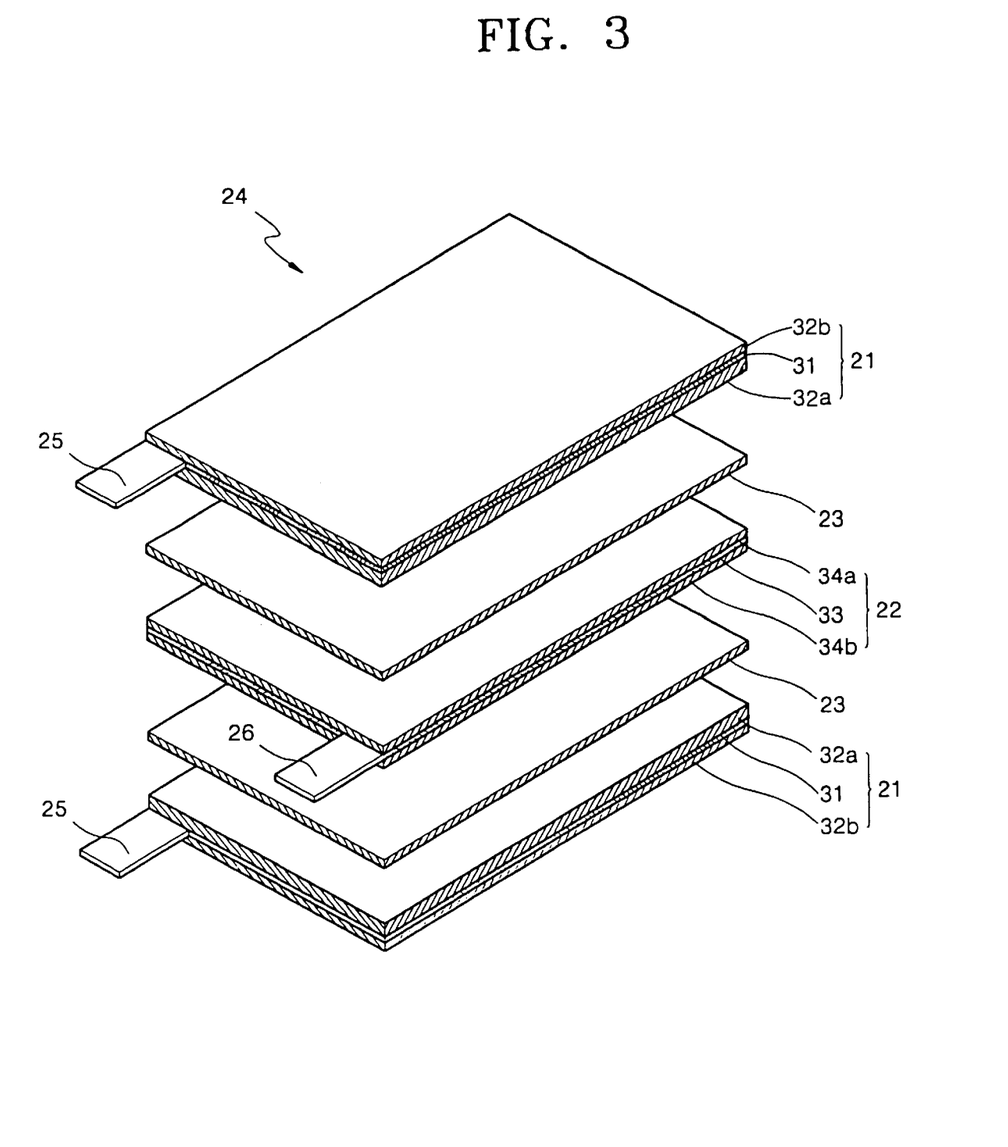
FIG. 3 is an exploded perspective view illustrating a cathode plate, a separator and an anode plate of the battery shown in FIG. 2.

Now, the battery cell 24 shown in FIG. 2 will be described in more detail with reference to FIG. 3.

The battery cell 24 includes the cathode plate 21, the anode plate 22, and the separator 23 interposed between the cathode plate 21 and the anode plate 22.

The cathode plate 21 includes a cathode current collector 31 made of a thin aluminum foil film and cathode sheets 32a and 32b tightly fixed to both surfaces of the cathode current collector 31.

The cathode current collector 31 is made of punched metal or expanded metal having a plurality of openings, although not shown.

The cathode sheets 32a and 32b are fabricated by adding a binder, a conductive material and a plasticizer to a cathode active material layer as a main component, for example, an oxide selected from the group consisting of a lithium oxide, a nickel-based oxide, and a manganese-based oxide.

The anode plate 22 includes an anode current collector 33 made of a thin copper foil film, and anode sheets 34a and 34b tightly fixed to opposite surfaces of the anode current collector 33. The anode current collector 33 is made of punched metal or expanded, like the cathode current collector 31 and the anode sheets 34a and 34b fabricated by adding a binder, a conductive material, and a plasticizer to an oxide made of a carbon material, as a main component.

Here, the battery cell 24 is a bi-cell type battery constructed such that a plurality of assembled batteries each having the separator 23 installed at both sides around the anode plate 22 and having the cathode plate 21 installed at the outside of the separator 23, are stacked.

The cathode sheets 32a and 32b include a front cathode sheet 32a tightly fixed to one surface of the cathode current collector 31 adjacent to the anode plate 22, and a rear cathode sheet 32b fixed to the other surface of the cathode current collector 31, relatively distant from the anode plate 22 rather than the front. cathode sheet 32a, and the rear cathode sheet 32b having a thickness different from that of the front cathode sheet 32a.

The feature of the present invention lies in that the thickness of the front cathode sheet 32a is different from that of the rear cathode sheet 32b, as described above.

In more detail, the ratio of the thicknesses of the front and rear cathode sheets 32a and 32b is 5:1 to 1:1. In other words, the conventional cathode sheets (15 of FIG. 1) and the cathode sheets 32a and 32b of the present invention are the same in view of their compositions, that is, both containing cathode active materials, but are different in view of the ratio of the thicknesses of the cathode sheets, while the overall thickness of the battery cell 24 according to the present invention is maintained to be the same with that of the conventional battery cell.

The charging and discharging mechanism of the battery cell 24 having the above-described configuration will now be described.

Charging and discharging behaviors occur by the repetition of intercalation in which lithium ions contained in the lithium oxide of the cathode plate 21 move to the anode plate 22 and deintercalation in which lithium ions intercalated between carbon molecules of the anode plate 22 move back to the cathode plate 21. Here, important factors include transfer of charges at the boundary between an electrolytic solution and an electrode, movement of guest ions in the electrode, ion movement by electron movement due to a difference in the voltage, ion diffusion due to a difference in the concentration, resistance between the cathode and anode plates 21 and 22 and the like.

In this embodiment, the amounts of cathode active materials of the front and rear cathode sheets 32a and 32b are comparatively adjusted, thereby improving a high-rate discharging efficiency by the movement of lithium ions, among the above-stated factors.

Here, charging refers to a reaction in which lithium ions contained in the lithium oxide of the front and rear cathode sheets 32a and 32b move to the anode plate 22 to then be intercalated between carbon molecules of the anode plate 22. Conversely, discharging refers to a reaction occurring when lithium ions intercalated between carbon molecules of the anode plate 22 move back to the front and rear cathode sheets 32a and 32b. Likewise, as lithium ions reciprocate between the cathode and anode plates 21 and 22 in response to the charging and discharging, an electromotive force is generated.

Table 1 and FIGS. 4 through 7 show the discharging efficiency characteristics depending on the ratio of the thicknesses of the front and rear cathode sheets 32a and 32b of the battery cell 24 according to the present invention.

TABLE 1

| Thickness ratio of front and rear cathode sheets | 0.5 C discharging rate | 1 C discharging rate | 2 C discharging rate |
| --- | --- | --- | --- |
| 5:1 | 95.12% | 89.47% | 66.40% |
| 5:2 | 95.17% | 89.85% | 72.45% |
| 2:1 | 94.37% | 87.45% | 67.90% |
| 3:2 | 94.37% | 85.83% | 65.45% |
| 1:1 | 94.35% | 87.20% | 61.35% |
| 2:3 | 92.75% | 84.40% | 54.53% |
| 2:5 | 93.30% | 84.20% | 50.50% |

In Table 1, nC means that charging and discharging are performed by supplying current corresponding to the capacity of a battery for a time of 1/n.

Figure 4:
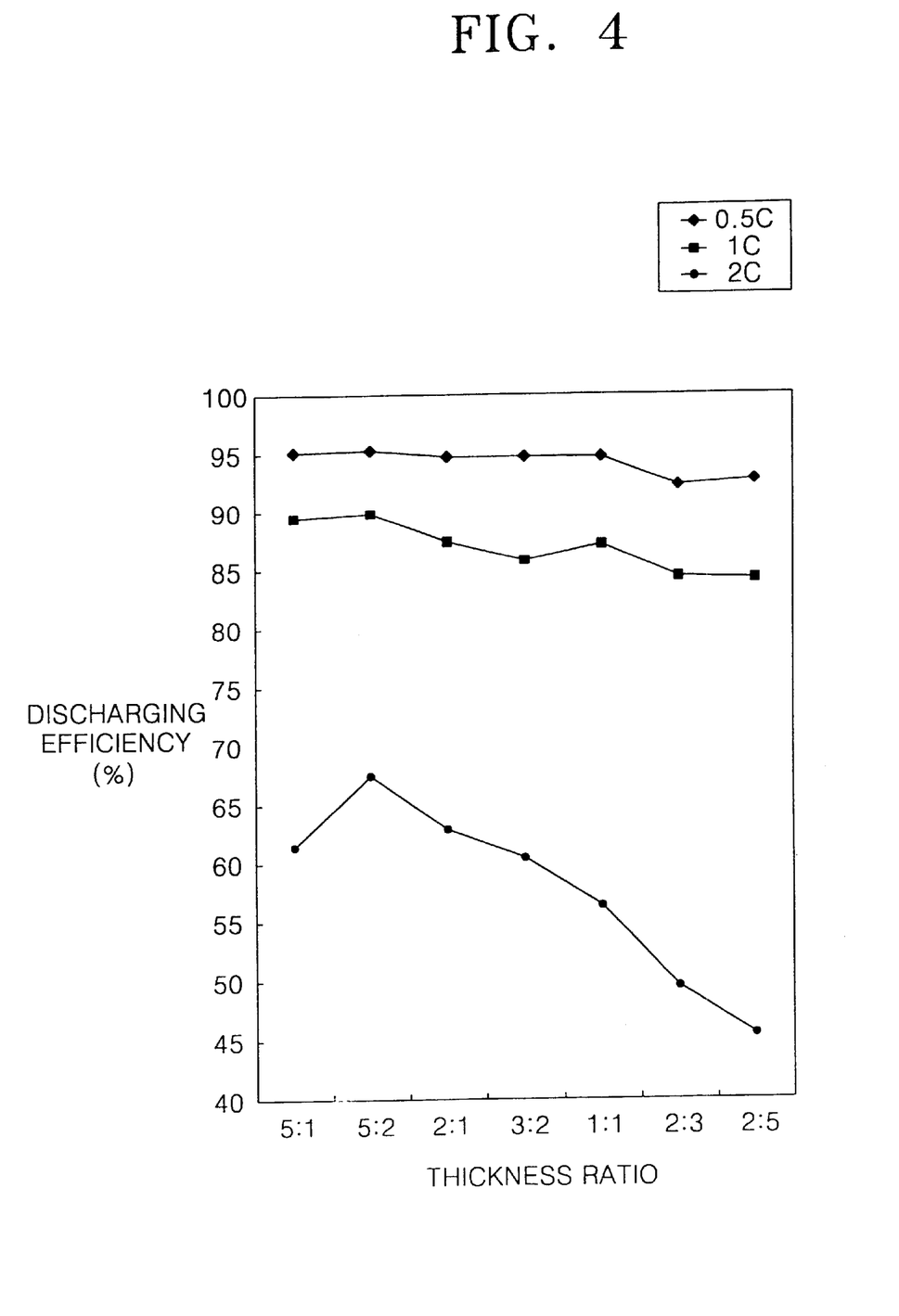
FIG. 4 is a graph showing the discharging efficiency characteristic depending on the ratio of the thicknesses of the respective plates according to the present invention.
Figure 5:
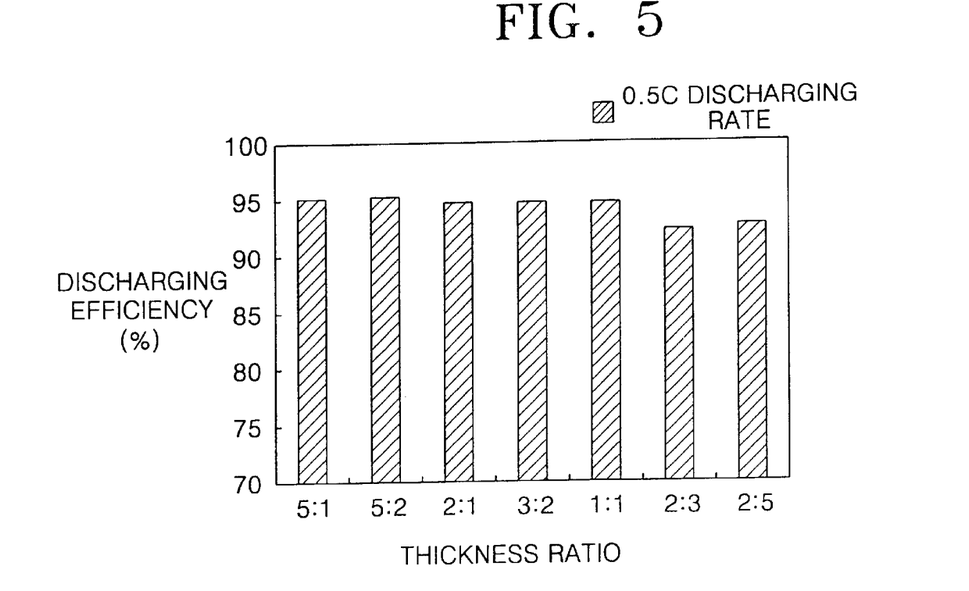
FIG. 5 is a graph showing the discharging efficiency characteristic depending on the ratio of the thicknesses of the respective plates at a 0.5C discharging rate in the electrode shown in FIG. 4.
Figure 6:
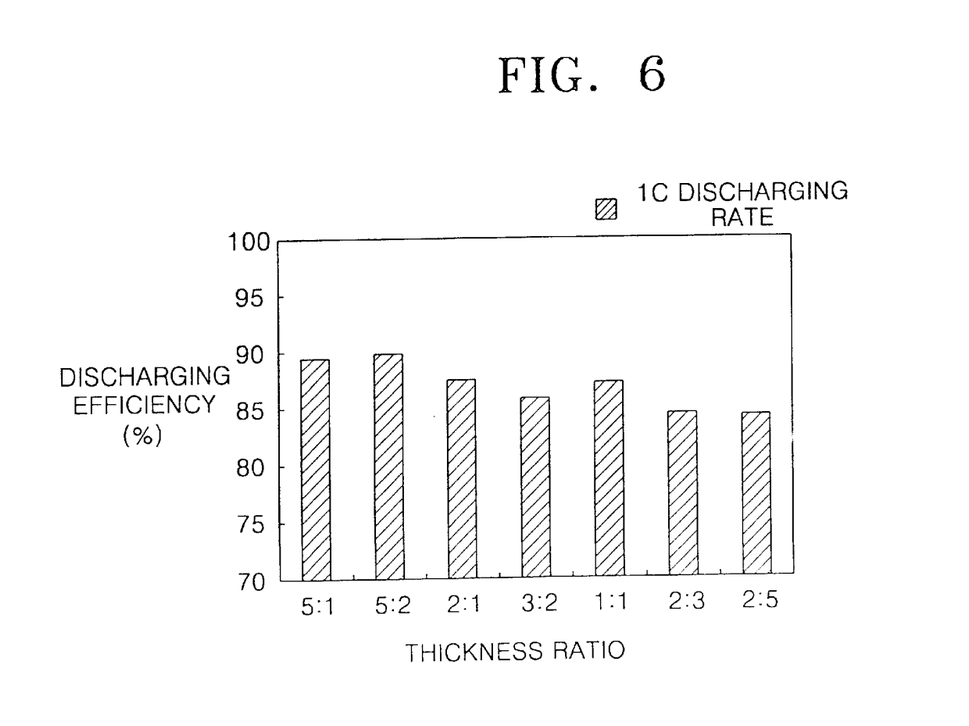
FIG. 6 is a graph showing the discharging efficiency characteristic depending on the ratio of the thicknesses of the respective plates at a 1C discharging rate in the electrode shown in FIG. 4.
Figure 7:
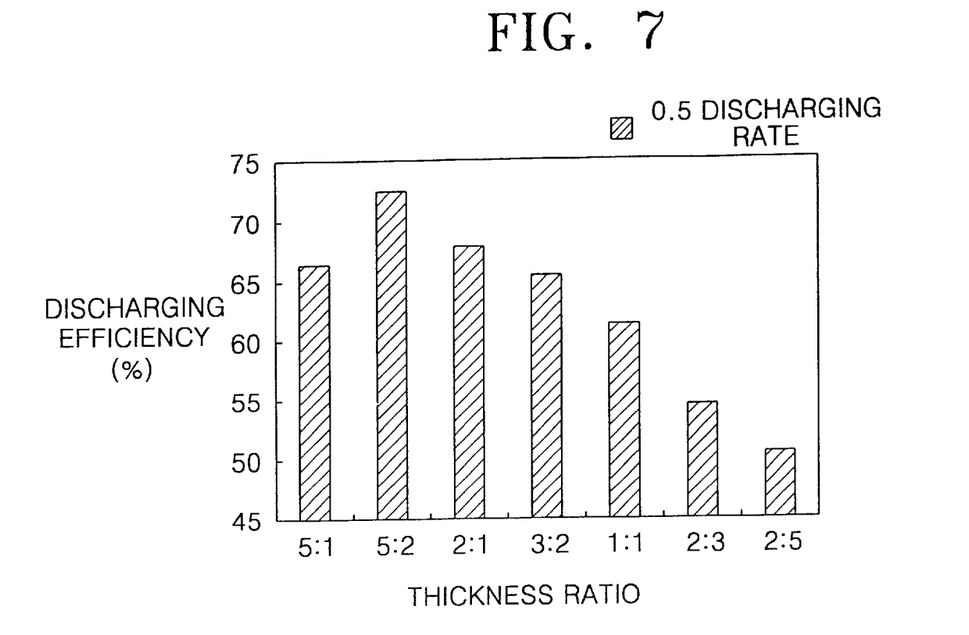
FIG. 7 is a graph showing the discharging efficiency characteristic depending on the ratio of the thicknesses of the respective plates at a 2C discharging rate in the electrode shown in FIG. 4.

Also, in FIG. 4, the horizontal axis indicates the ratio of the thicknesses of the front and rear cathode sheets 32a and 32b. FIGS. 5 through 7 are graphs showing discharging efficiencies depending on the ratio of the thicknesses of the front and rear cathode sheets 32a and 32b of the battery shown in FIG. 4, at 0.5C, 1C and 2C discharging rates, respectively.

First, referring to FIG. 4, at the 0.5C and 1C discharging rates, which are relatively low-rate discharging efficiencies, the discharging efficiencies are not greatly affected by the ratio of the thicknesses of the front and rear cathode sheets 32a and 32b, exhibiting approximately 80 to 90% or higher. On the other hand, at the 2C discharging rate, which is a relatively high-rate discharging efficiency, the discharging efficiency is noticeably reduced, that is, approximately 70% or lower.

In more detail, as shown in FIG. 5, at the 0.5C discharging rate, when the thickness ratios are 5:1, 5:2, 2:1 and 3:2, that is, when the front cathode sheet 32a is thicker than the rear cathode sheet 32b, when the thickness ratio is 1:1, that is, when the thicknesses of the front and rear cathode sheets 32a and 32b are the same, or when the thickness ratios are 2:3 and 2:5, that is, when the rear cathode sheet 32b is thicker than the front cathode sheet 32a, the discharging efficiencies are all excellent, 90% or higher.

Also, when the front cathode sheet 32a is thicker than the rear cathode sheet 32b, the discharging efficiency of approximately 0.02 to 0.82% at most is improved, compared to when the thicknesses of the front and rear cathode sheets 32a and 32b are the same. In other words, at a low discharging rate, the discharging efficiency is barely affected by a change in the thicknesses of the front and rear cathode sheets 32a and 32b.

FIG. 6 is a graph showing the discharging efficiency characteristic depending on the ratio of the thicknesses of the front and rear cathode sheets 32a and 32b at a 1C discharging rate, exhibiting a similar tendency to that of the 0.5C discharging rate shown in FIG. 5. In other words, when the thickness ratios are 5:1, 5:2, 2:1 and 3:2, that is, when the front cathode sheet 32a is thicker than the rear cathode sheet 32b, the discharging efficiencies are 89.47%, 89.85%, 87.45% and 85.83%, respectively. Also, when the thicknesses of the front and rear cathode sheets 32a and 32b are the same, the discharging efficiency is 87.2%.

Conversely, when the thickness ratios are 2:3 and 2:5, that is, when the rear cathode sheet 32b is thicker than the front cathode sheet 32a, the discharging efficiencies are 84.4% and 84.2%, respectively. That is, the discharging efficiency depending on the thickness ratio is approximately 80% or higher, which is excellent. However, when the front cathode sheet 32a is thicker than the rear cathode sheet 32b, the discharging efficiency is further improved by about 0.25 to 2.65% compared to when the thicknesses of the front and rear cathode sheets 32a and 32b are the same.

At a high discharging rate of 2C, the difference in the discharging efficiency depending on a relative thickness difference, that is, the thickness ratio, is noticeable. As shown in FIG. 7, when the thickness ratios are 5:1, 5:2, 2:1 and 3:2, that is, when the front cathode sheet 32a is thicker than the rear cathode sheet 32b, the discharging efficiencies are 66.4%, 72.45%, 67.9% and 65.45%, respectively. Also, when the thicknesses of the front and rear cathode sheets 32a and 32b are the same, the discharging efficiency is 61.3%.

Conversely, when the thickness ratios are 2:3 and 2:5, that is, when the rear cathode sheet 32b is thicker than the front cathode sheet 32a, the discharging efficiencies are 54.53% and 50.5%, respectively. On the whole, at the 2 C discharging rate, the discharging efficiency depending on the thickness ratio is noticeably lower than the 0.5C or 1C discharging rate. Here, in the case when one of the front and rear cathode sheets 32a and 32b is thicker than the other, a notable difference in the discharging efficiency is generated compared to the case when the thicknesses of the front and rear cathode sheets 32a and 32b are the same.

That is to say, when the front cathode sheet 32a is thicker than the rear cathode sheet 32b, the discharging efficiency is further improved by about 4.1 to 11.1% compared to the case when the thicknesses of the front and rear cathode sheets 32a and 32b are the same. Conversely, when the rear cathode sheet 32b is thicker than the front cathode sheet 32a, the discharging efficiency is noticeably lower than the case when the thicknesses of the front and rear cathode sheets 32a and 32b are the same.

Consequently, when the front cathode sheet 32a is thicker than the rear cathode sheet 32b, as in this embodiment, the characteristic of a high discharging efficiency is excellent, as compared to the conventional case when the front and rear cathode sheets 15 have the same thicknesses with respect to the cathode current collector (14 of FIG. 1).

When the front cathode sheet 32a is excessively thicker than the rear cathode sheet 32b, that is, when the thickness ratio is 5:1, an adverse effect, that is, a decrease in electrical conductivity, is caused due to an increase in the concentration polarization or a relative increase in the thickness of the front cathode sheet 32a, thereby lowering the discharging efficiency somewhat.

Figure 8:
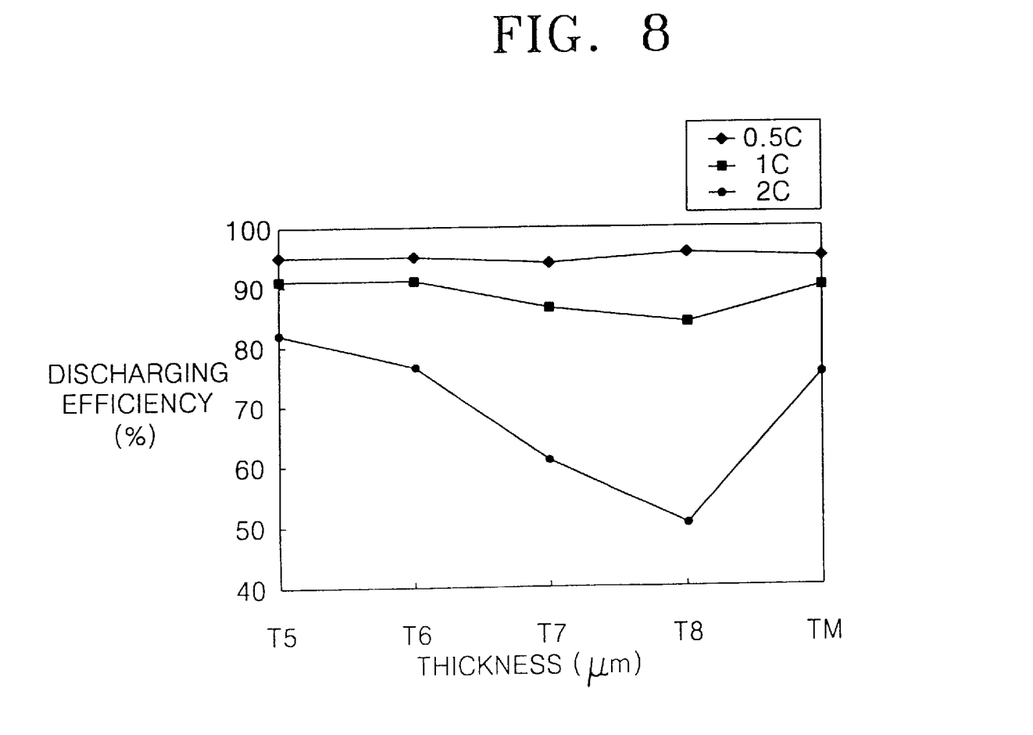
FIG. 8 is a graph showing the discharging efficiency characteristic depending on the change in the thicknesses of the respective plates.

Table 2 and FIG. 8 show the change in the discharging characteristics depending on a change in the thicknesses of a cathode plate.

TABLE 2

|  | T5 | T6 | T7 | T8 | TM |
| --- | --- | --- | --- | --- | --- |
| 0.5 C | 95% | 95% | 94% | 96% | 95% |
| 1 C | 90% | 91% | 87% | 84% | 90% |
| 2 C | 82% | 77% | 61% | 51% | 76% |

In Table 2, T5, T6, T6 and T8 represent samples whose cathode sheets have thicknesses of 50 $\mu$m, 60 $\mu$m, 70 $\mu$m and 80 $\mu$m, respectively, and TM represents a sample whose front cathode sheet has a thickness of 80 $\mu$m and whose rear cathode sheet has a thickness of 50 $\mu$m.

As shown in Table 2 and FIG. 8, there is little change in the discharging efficiencies at the 0.5C or 1C discharging rate, while exhibiting a relatively excellent discharging efficiency on the whole. However, at the 2C discharging rate, as the thickness of a cathode sheet increases, the discharging efficiency is noticeably reduced. In other words, the thinner the cathode sheet is, the higher the high-rate discharging efficiency is.

However, when the cathode sheet is thin, the electrical capacity of a battery is low, as compared to the case when the cathode sheet is thick. Thus, in the case of cathode sheets having the same thicknesses, a relatively high-rate discharging efficiency can be achieved by varying the thicknesses of front and rear cathode sheets.

As shown in the graph of FIG. 8, in the case of a cathode sheet whose front and rear cathode sheets have a thickness of 65 $\mu$m, respectively, the discharging efficiency is 68% at a 2C discharging rate. By comparison, in the case of a TM sample whose front and rear cathodes sheets have thicknesses of 50 $\mu$m and 80 $\mu$m, respectively, the discharging efficiency is 76%, that is, about 8% higher than the former case.

The reason why the discharging efficiency of the TM sample is excellent is presumably that an increase in the thickness of the front cathode sheet which is relatively close to an anode plate, increases the speed of lithium ions which move toward the anode plate and that the front cathode sheet participates in plate reactions more actively than the rear cathode sheet.

Consequently, when cathode plates having the same thicknesses are fabricated, an improved high-rate discharging efficiency can be achieved by varying the ratio of the thicknesses of the front and rear cathode sheets, without a change in the overall thickness of a cathode plate.

As described above, the lithium secondary battery according to the present invention has the following advantages by varying the ratio of the thicknesses of front and rear cathode sheets fixed to opposite surfaces of a cathode current collector.

In a battery cell having the same electrical capacity, the discharging efficiency can be improved by making a front cathode sheet of a cathode plate, which is adjacent to an anode plate, thicker than a rear cathode sheet. Accordingly, even if the electrical capacity of a battery remains the same as in the conventional case, the overall thickness of the battery can be reduced by varying the ratio of the thicknesses of front and rear cathode sheets, thereby achieving a light, thin and small battery.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lithium secondary battery having a bi-cell battery cell including:

an anode plate, first and second separators fixed to respective opposite surfaces of and sandwiching the anode plate, and first and second cathode plates fixed to outer surfacer of the first and second separators, respectively, wherein each of the first and second cathode plates includes a cathode current collector, a front cathode sheet fixed to a front surface of the cathode current collector, adjacent to a respective one of the first and second separators, and a rear cathode sheet fixed to a rear surface of the cathode current collector, remote from the respective one of the first and second separators, and having a smaller thickness than the front cathode sheet, wherein the front cathode sheet is no thicker than five times the thickness of the rear cathode sheet.

2. The lithium secondary battery according to claim 1, wherein the front and rear cathode sheets include a main component selected from the group consisting of lithium-based oxide, nickel-based oxide, and manganese-based oxide.

3. A lithium secondary battery comprising:

a generally planar anode plate having an anode current collector and an anode sheet fixed to at least one surface of the anode current collector;

a generally planar cathode plate having a cathode current collector, a front cathode sheet fixed to a front surface of the cathode current collector and proximate the anode plate, and a rear cathode sheet fixed to a rear surface of the cathode current collector, remote from the anode plate, the rear cathode sheet having a thickness smaller than the front cathode sheet; and a separator interposed between the anode plate and the cathode plate, wherein the front cathode sheet is no thicker than five times the thickness of the rear cathode sheet.

* * * * *